(12) United States Patent
Vidyadhara et al.

(10) Patent No.: US 10,019,253 B2
(45) Date of Patent: Jul. 10, 2018

(54) SYSTEMS AND METHODS OF UPDATING HOT-PLUGGABLE DEVICES

(71) Applicant: Dell Products L.P., Round Rock, TX (US)

(72) Inventors: Sumanth Vidyadhara, Bangalore (IN); Parmeshwr Prasad, Bangalore (IN); Srinivas G. Gowda, Bangalore (IN); Raghavendra Venkataramudu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 15/048,419

(22) Filed: Feb. 19, 2016

(65) Prior Publication Data

US 2017/0242686 A1    Aug. 24, 2017

(51) Int. Cl.
| | |
|---|---|
| *G06F 9/445* | (2018.01) |
| *G06F 8/656* | (2018.01) |
| *G06F 8/654* | (2018.01) |
| *G06F 1/32* | (2006.01) |
| *G06F 9/4401* | (2018.01) |

(52) U.S. Cl.
CPC ............... *G06F 8/656* (2018.02); *G06F 8/67* (2013.01); *G06F 1/3234* (2013.01); *G06F 1/3287* (2013.01); *G06F 8/654* (2018.02); *G06F 9/4401* (2013.01); *G06F 9/4411* (2013.01); *Y02D 10/171* (2018.01); *Y02D 10/42* (2018.01)

(58) Field of Classification Search
CPC . G06F 8/67; G06F 8/654; G06F 8/656; G06F 9/4401; G06F 9/4411; G06F 1/3234; G06F 1/3287; Y02D 10/171; Y02D 10/42
USPC ......................................................... 717/168
See application file for complete search history.

(56) References Cited

U.S. PATENT DOCUMENTS

| | | | |
|---|---|---|---|
| 2014/0244888 A1 | 8/2014 | Kallickal | |
| 2015/0100707 A1* | 4/2015 | Bajpai | G06F 8/654 710/10 |
| 2016/0202964 A1* | 7/2016 | Butcher | G06F 8/65 717/172 |
| 2016/0231804 A1* | 8/2016 | Bulusu | G06F 1/3287 |
| 2016/0246751 A1* | 8/2016 | Cai | G06F 13/4081 |

(Continued)

OTHER PUBLICATIONS

ESRT Table Definition, Printed From Internet Jan. 7, 2016, 5 pgs.

(Continued)

*Primary Examiner* — Wei Zhen
*Assistant Examiner* — Mohammed Huda
(74) *Attorney, Agent, or Firm* — Egan Peterman Enders Huston (57) ABSTRACT

Systems and methods are provided for updating hot-pluggable devices of an information handling system using dynamic EFI System Resource Table (ESRT) entries to implement an ESRT entry update procedure for hot-pluggable devices. Extended configuration space (e.g., such as PCIe Extended Config Space) of a hot-pluggable device may be utilized to store firmware update version information such as firmware version details, which is used in the OS space to update the ESRT table, and the system OS may read and apply the updated firmware version information and apply the firmware update immediately without additional OS reboots.

20 Claims, 3 Drawing Sheets

(56) References Cited

U.S. PATENT DOCUMENTS

2017/0010884 A1* 1/2017 Liu .......................... G06F 8/67
2017/0046152 A1* 2/2017 Shih ....................... G06F 8/654

OTHER PUBLICATIONS

Larabel, "Linux BIOS/UEFI Updating Is Going to Get Much Better With UEFI 2.5", Printed from Internet Oct. 15, 2015, 4 pgs.
Richardson, "Better Firmware Updates in Linux Using UEFI Capsules", Intel Software and Services, Printed from Internet Jan. 3, 2016, 4 pgs.
Larabel, "Linux BIOS/UEFI Updating Is Going to Get Much Better With UEFI 2.5", Printed from Internet Jan. 3, 2016, 2 pgs.
Larabel, "Linux 4.2 to Support the EFI System Resource Table", Printed from Internet Jan. 3, 2016, 4 pgs.
PCI Configuration Space, Wikipedia, Printed from Internet Jan. 7, 2016, 6 pgs.
Butcher et al., "Systems and Methods of Device Firmware Delivery for Pre-Boot Updates", U.S. Appl. No. 14/596,627, filed Jan. 14, 2015, 36 pgs.
Liu et al., "Systems and Methods to Securely Inject Binary Images and Code Into Firmware", U.S. Appl. No. 14/792,083, filed Jul. 7, 2015, 27 pgs.
Vidyadhara et al., "Unified Extensible Firmware Interface (UEFI) Credential-Based Access of Hardware Resources", U.S. Appl. No. 14/703,912, filed May 5, 2015, 20 pgs.
Microsoft Corporation Technical Documentation License Agreement, "Windows Hardware Certification Requirements for Client and Server Systems", Printed From Internet Feb. 18, 2016, 296 pgs.
Microsoft, "Windows UEFI Firmware Update Platform", Apr. 4, 2014, 46 pgs.

* cited by examiner

SYSTEMS AND METHODS OF UPDATING HOT-PLUGGABLE DEVICES

FIELD

The disclosed systems and methods relate generally to information handling systems and, more particularly, to hot-pluggable device firmware for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Unified Extensible Firmware Interface ("UEFI") capsules have been employed in the past by a computer operating system (OS) to stage updates for device firmware, such as device driver firmware in the form of Option ROM stored in non-volatile memory of a network adapter device for use during system OS boot. The device firmware makes a boot time decision whether to apply a given UEFI capsule, such as based on integrity checks or other platform parameters. UEFI Firmware Management Protocol (FMP) pre-boot software has been used to locate and identify existing and new versions of UEFI driver firmware for the device, and then to program an appropriate new device driver firmware image into non-volatile memory of the device via computer system memory, e.g., in a manner consistent with Chapter 32 of UEFI Specification 2.5. UEFI capsules may be used to update device firmware without requiring a full system firmware update.

An EFI System Resource Table (ESRT) has been employed to identify device and system resources having updatable firmware. Each ESRT entry describes a resource that can be targeted by a firmware capsule update, and also lists status of the last attempted update of that resource. Conventional ESRT methodology is used to update firmware for a newly inserted Peripheral Component Interconnect Express (PCIe) hot-pluggable device in the following manner. After the new hot-pluggable PCIe device is inserted and coupled to the system PCIe bus, the system OS first reboots before proceeding further to allow the UEFI pre-boot firmware to: detect the newly added hot-pluggable device, to identify which ESRT entry to be populated in the UEFI configuration table (ConfigTable), and then to create a mapping in the ESRT table for the new device. Then, a second and additional OS reboot is required. At the second OS reboot following the new device insertion, the OS understands that a newer firmware version is available for the device, and then applies the firmware update after the required second reboot.

SUMMARY

Disclosed herein are systems and methods for updating hot-pluggable devices of an information handling system using dynamic EFI System Resource Table (ESRT) entries to implement an ESRT entry update procedure for hot-pluggable devices, e.g., by handling hot-pluggable device firmware updates at runtime using ESRT and UEFI Capsule methodology. In particular, the disclosed systems and methods may be implemented to use extended configuration space (e.g., such as PCIe Extended Config Space) of a hot-pluggable device to store firmware update version information for the device that is used upon insertion of the hot-pluggable device while the system operating system (OS) is actively running on a host processing device (e.g., CPU) of an information handling system. The extended configuration space of the device is used to store the firmware version details, which is used in the OS space to read this information and update the ESRT table, e.g., the PCIe extended configuration space may include a firmware original equipment manufacturer (OEM) ID structure that contains one or more device firmware version details for updating ESRT table entries.

In one exemplary embodiment, an OEM ID structure may be updated by PCIe OEM vendor/s with the relevant information on Firmware information which may be inferred from the PCIe Exception Handler in OS, and this information is never changed. Specifically, when the new hot-pluggable device is plugged in, the system OS may read and apply the updated firmware version information and apply the firmware update immediately without additional OS reboots (e.g., via UEFI capsule update or any other suitable update methodology). This is in contrast to conventional ESRT methodology, where for any newly inserted hot-pluggable device, the ESRT Table does not reflect the new device capabilities, firmware versions and whether it is ESRT update capable.

In one embodiment of the disclosed systems and methods, PCIe hot-pluggable devices may be inserted when an OS is active, without waiting for device firmware update. In one embodiment, message system interrupt (MSI) handlers (e.g., such as PCIe handlers) may be employed to receive this firmware information and to cause the OS to store the information in the ESRT where it is kept available. In this way, this firmware update information may then be used to update a hot-pluggable device immediately with no reboot or with only a single reboot of the OS, or the firmware update may be deferred based on specific implementation requirements or desires. However, in any case, the number of required OS system reboots needed for completion of a device firmware update is advantageously reduced by at least one reboot cycle compared to what is required by conventional UEFI Capsule and conventional ESRT methodologies in order to complete a device firmware update in a manner that reduces maintenance time and reduces server down time while enabling support for firmware updates at runtime. This is in contrast to conventional firmware update methodology for hot-pluggable devices that require at least two system OS reboots to update the firmware for a hot-pluggable device after insertion of the hot-pluggable device into the system. By only requiring a single reboot to update firmware for a newly-inserted hot-pluggable device, the disclosed systems and methods offer significant advantages in the Data Center environment, where devices are plugged in and out, and system updates are required with shorter downtime for the updates to work.

In one embodiment, the disclosed systems and methods may be implemented to perform runtime updates of an ESRT table to facilitate firmware updates for hot-pluggable devices (e.g., such as PCIe hot pluggable devices) for firmware updates. The disclosed systems and methods may be further implemented in one embodiment to update firmware of a hot pluggable device without requiring multiple information handling system reboots, i.e., with only one reboot being required after ESRT table update. In one embodiment, the disclosed systems and methods may be employed to update firmware for any PCIe hot pluggable device supported by the system OS executing on a central processing unit (CPU), e.g., when such a device is inserted or communicatively coupled to a system communication bus (e.g., communicatively coupled to a system expansion bus such as a system PCIe serial expansion bus) and generates a Hotplug Event.

In one exemplary embodiment, the disclosed systems and methods may be implemented to update one or more ESRT entries of a PCIe hot-pluggable device at run time of an OS, e.g., using a UEFI capsule method to identify a new ESRT capsule global unique identifier (GUID) which may be used to update a newer entry to the ESRT in the UEFI Config Table. This methodology may be implemented in a further embodiment with no changes in the Current EFI Runtime Service access from OS to support this ESRT update. In a further embodiment, all logic used to handle and update a new ESRT entry may be performed in UEFI firmware which is aware of the ESRT hot-pluggable device GUID in an original equipment manufacturer (OEM) UEFI Capsule GUID. This process may be advantageously employed in one embodiment to save reboot time on an information handling system (such as a computer server) for any new PCIe devices detected, as they can be ready for firmware updates.

In the practice of the disclosed systems and methods it is not necessary (although it is possible) to immediately complete a device firmware update after a given hot pluggable device is inserted and coupled to an expansion bus. In this regard, any time a new hot-pluggable device is inserted and the system OS is not rebooted, it is possible to complete the firmware update at any time with either no reboot, or with just a single reboot of the OS, and without requiring two or more OS reboots. This capability is particularly advantageous for system applications where it is desirable to limit system OS reboots and/or perform OS reboots only at specific times since the OS may be rebooted when desired and since the OS does not need to be rebooted or only needs to be rebooted once (rather than two or more times) to complete a device firmware update. Examples of such cases include operating systems like Tandem Unix (Non-Stop Kernel) where the OS shouldn't be brought down on enterprise systems, or system applications such as high frequency trading which use high availability operating systems. In this regard, for devices that support firmware updates without a system reboot, an existing UEFI Capsule update mechanism may reboot the system once. However, in other cases, updates without reboot is possible for hot-pluggable devices. The disclosed systems and methods thus may be implemented in a manner that is advantageous for enterprise users by saving device firmware update time and by keeping the user in sync with the latest firmware versions on a given device.

In one respect, disclosed herein is an information handling system, including: at least one processing device configured to execute a host operating system (OS); non-volatile memory coupled to the processing device, the non-volatile memory having a Unified Extensible Firmware Interface (UEFI) table stored thereon; and a communication bus coupled to the processing device, the communication bus being configured to receive a hot-pluggable device in data communication with the communication bus. The processing device may be configured to perform the following steps in response to coupling of a new hot-pluggable device in data communication with a communication bus of the information handling system during runtime of an operating system (OS) executed by the processing device and without rebooting the OS after the new hot-pluggable device is coupled in data communication with the communication bus: detect coupling of the new hot-pluggable device in data communication with the communication bus of the information handling system during the OS runtime, the new hot-pluggable device including device firmware and memory registers that contain an extended device configuration space for the new hot-pluggable device that itself includes one or more device firmware version details, then read the extended device configuration space and use an update capsule to retrieve the device firmware version details from the extended device configuration space of the new hot-pluggable device, and then update an EFI System Resource Table (ESRT) of the UEFI table stored on the system non-volatile memory with the retrieved firmware version details.

In another respect, disclosed herein is a method, including: using at least one processing device of an information handling system to perform the following steps in response to coupling of a new hot-pluggable device in data communication with a communication bus of the information handling system during runtime of an operating system (OS) executed by the processing device and without rebooting the OS after the new hot-pluggable device is coupled in data communication with the communication bus: detecting coupling of the new hot-pluggable device in data communication with the communication bus of the information handling system during the OS runtime, the new hot-pluggable device including device firmware and memory registers that contain an extended device configuration space for the new hot-pluggable device that itself includes one or more device firmware version details, then reading the extended device configuration space and using an update capsule to retrieve the device firmware version details from the extended device configuration space of the new hot-pluggable device, and then updating an EFI System Resource Table (ESRT) of a Unified Extensible Firmware Interface (UEFI) table with the retrieved firmware version details.

DESCRIPTION OF ILLUSTRATIVE EMBODIMENTS

Figure 1:
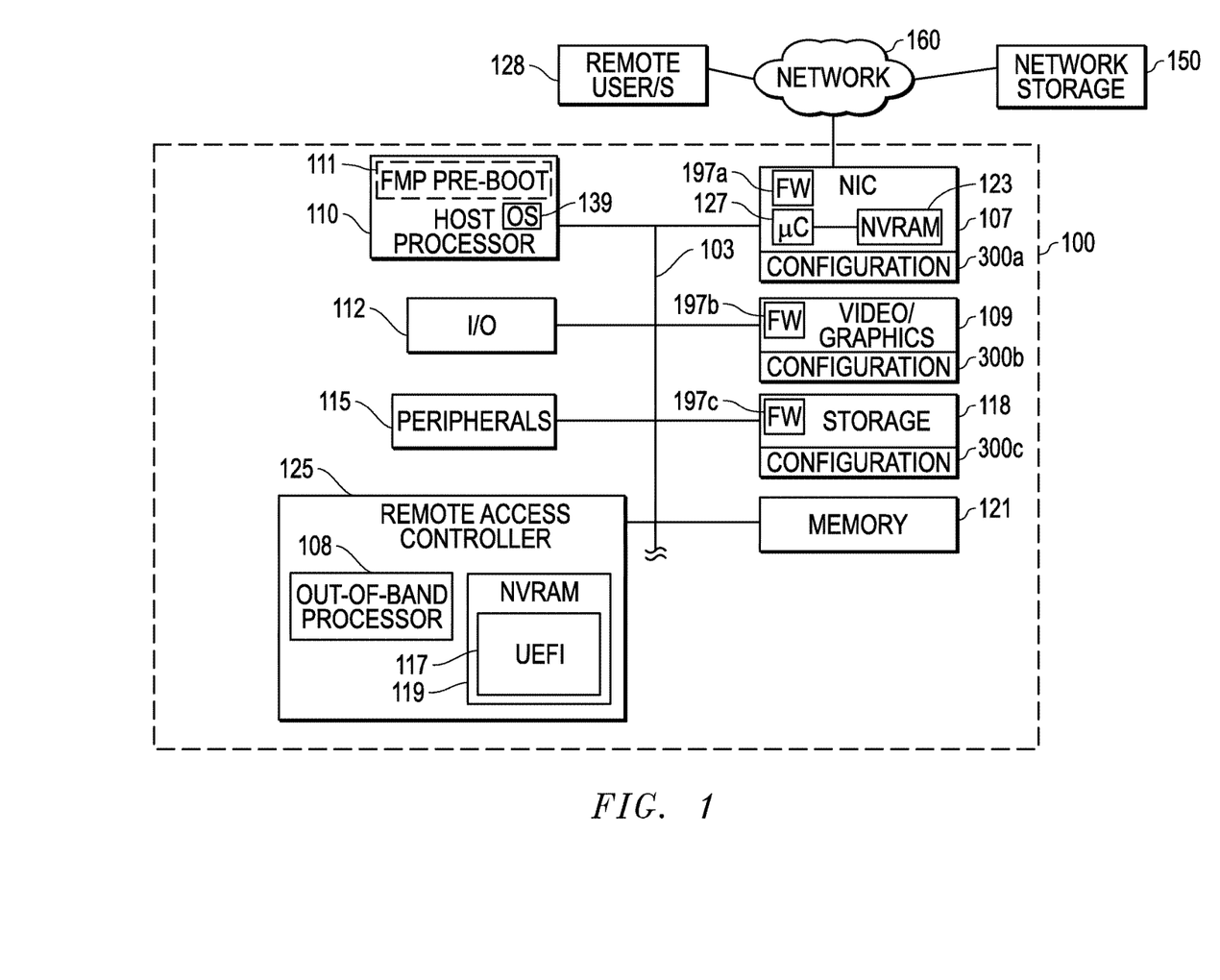
FIG. 1 illustrates a simplified block diagram of an information handling system configured according to one exemplary embodiment of the disclosed systems and methods.

FIG. 1 illustrates an information handling system 100 (e.g., server, desktop PC, etc.) configured according to one exemplary embodiment of the disclosed systems and methods. As shown, information handling system 100 includes a remote access controller 125 that includes at least one out-of-band processor 108 and associated embedded non-volatile memory (e.g., non-volatile random access memory "NVRAM") 119. Examples of remote access controller 125 include an integrated Dell Remote Access Controller (iDRAC) available from Dell Products L.P. of Round Rock, Tex., etc.). Further information on UEFI capsules and device firmware updating may be found in U.S. patent application Ser. No. 14/596,627 filed Jan. 14, 2015; and in U.S. patent application Ser. No. 14/792,083 filed Jul. 6, 2015, each of which is incorporated herein by reference in its entirety. It will be understood that UEFI code 117 including a UEFI configuration table may be stored on non-volatile memory such as memory 119 or other system non-volatile memory, such as storage 118 (e.g., hard drive), etc. A UEFI capsule may be retrieved, for example, from external network storage 150 across network 160 (e.g., Internet, corporate intranet, etc.) via network interface card (NIC)/network adapter 107 or from any other suitable external or local source, and may in one embodiment be passed as needed for firmware updates from the application level.

In one embodiment, a UEFI capsule may include one or more versions of operational drivers for updating firmware 197 of one or more FMP-based target PCIe devices on information handling system 100, such as network adapter 107 and/or other type of PCIe target device of an information handling system such as video/graphics controller 109, solid state drive or hard drive storage 118, or other possible devices such as RAID controller, BIOS, complex programmable logic devices (CPLDs), etc. Such PCIe target devices may be hot-pluggable and have an embedded processing device (e.g., such as microcontroller 127 of adapter 107) that is configured to load a resident driver into system memory 121 and execute other firmware components from target device embedded memory (e.g., non-volatile memory 123 of adapter 107).

Still referring to FIG. 1, system 100 may also include one or more host processing devices 110, one or more buses or communication media 103, video/graphics hardware 109, storage (e.g., hard disks) 118, system memory (e.g., RAM) 121, local input/output (I/O) 112, and peripherals 115. Bus/es 103 (e.g., PCIe bus and other appropriate data buses such as memory bus) provide a mechanism for the various components of system 100 to communicate and couple with one another, it being understood that bus/es 103 may represent multiple buses that are each only coupled to some of the component devices as appropriate. Host processing device/s 110 may include a Host processing device (e.g., CPU) configured to run a host operating system (OS) 139 (e.g., Windows-based OS, Linux-based OS, etc.) during in-band operation, and/or configured to run FMP-based pre-boot software (e.g., Dell Life Cycle Controller available from Dell Products L.P. of Round Rock, Tex.) 111 during out-of-band operation as needed, and out-of-band processor 108 may be a service processor, embedded processor, etc. Video/graphics 109, storage 118, memory 121, I/O 112 and peripherals 115 may have the structure, and perform the functions known to those of skill in the art. Besides memory 121, processing device 110 may include cache memory for storage of frequently accessed data, and storage 118 may include extended memory for processing device 110. One or more remote users 128 may also optionally communicate and interact with information handling system 100 via network 160 as shown.

Figure 3:
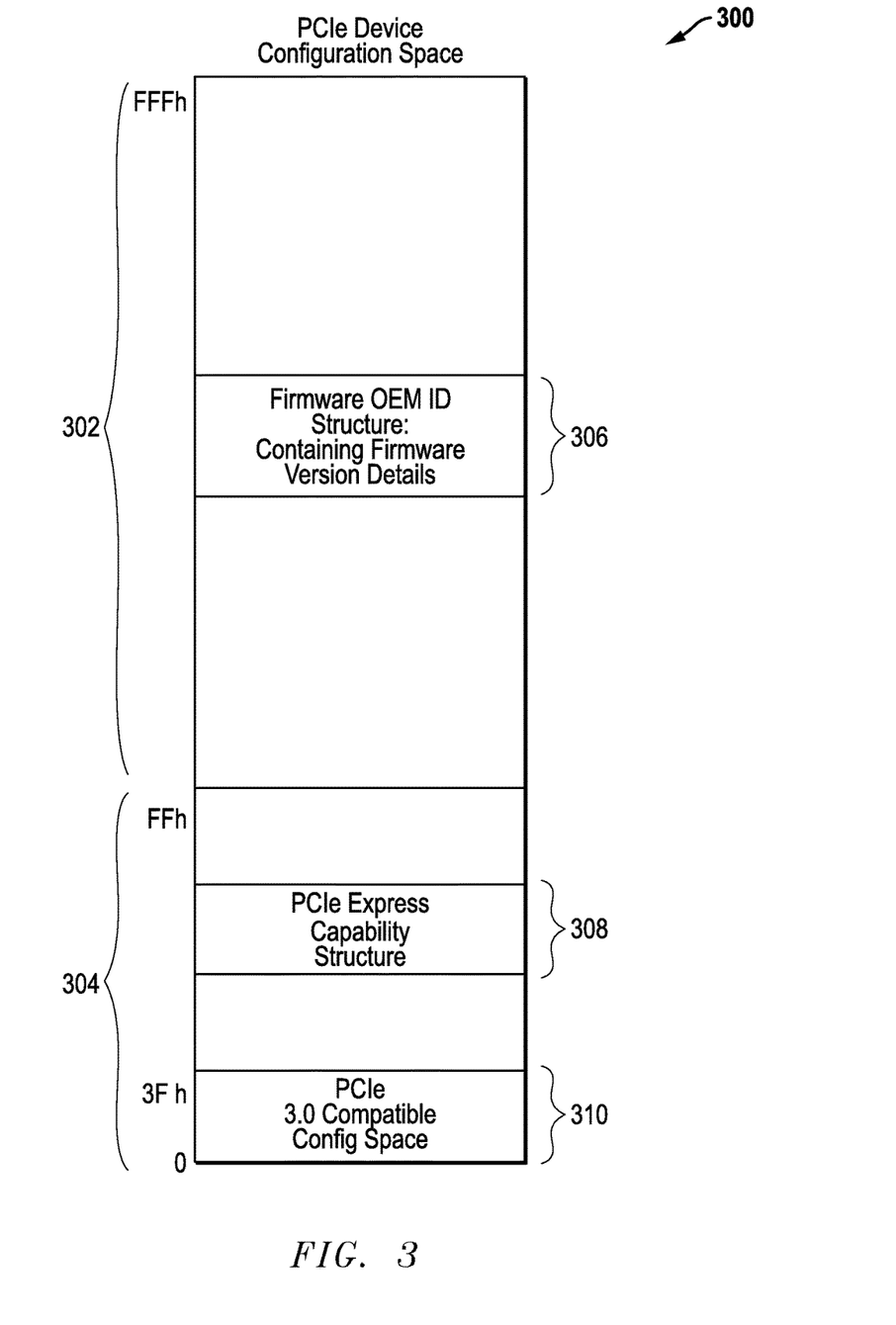
FIG. 3 illustrates PCIe device configuration space according to one exemplary embodiment of the disclosed systems and methods.

As further shown in FIG. 1, FMP-based target PCIe devices on information handling system 100 (e.g., 107, 109, 118 in FIG. 1) each include PCIe device configuration space, which itself includes PCIe extended configuration space 302 for PCIe Express parameters and standard PCIe configuration space 304 as illustrated in FIG. 3, and that are described further herein. It will be understood that the embodiment of FIG. 1 is exemplary only, and that an information handling system may be provided with one or more processing devices that may perform the functions of processing device 110, processing device 108, remote access controller 125, and other optional processing devices. Examples of such processing devices include, but are not limited to, central processing units (CPUs), embedded controllers, microcontrollers, application specific integrated circuits (ASICs), field programmable gate arrays (FPGAs), etc.

As shown in FIG. 3, PCIe device configuration space 300 includes registers that are accessible by OS 139, e.g., via an application programming interface (API). Standard PCIe configuration space 304 of each given target PCIe device includes 16-bit Device ID and 16-bit Vendor ID registers that identify the given target PCIe device and that are allocated by the Peripheral Component Interconnect Special Interest Group. PCIe Express capability structure 308 of standard PCIe configuration space 304 includes a list of capabilities, e.g., that is defined within the first 192 bytes of PCIe configuration space and that contains one byte to describe each capability, and one byte to point to the next capability. PCIe extended configuration space 302 may also include a list of extended capabilities that may be overlapping or different from the standard capability list of PCIe capability structure 308.

Still referring to FIG. 3, PCIe extended configuration space 302 includes a firmware OEM ID structure 306 that may contain one or more device firmware version details for updating ESRT table entries (e.g., such as device firmware version, last or lowest supported firmware version, capsule flags, last attempt version, last attempt status, etc.). In this regard, each hot-pluggable PCIe Device may have the OEM ID structure 306 stored in the PCIe extended configuration space 302 of its firmware details as shown. In one exemplary embodiment, the OEM ID structure 306 for a given device may be stored in the PCIe extended configuration space 302 of the device at factory provisioning of the information handling system 100 and all the 10 devices. In one embodiment, OEM ID may be updated by PCIe OEM vendor/s with the relevant information on Firmware information. In this exemplary embodiment, this information may be inferred from the PCIe Exception Handler in OS, and this information is never changed.

Table 1 below shows ESRT format and firmware resource entries contained in an ESRT table that may be included in one embodiment as device firmware version details in PCIe extended configuration space 302.

TABLE 1

| Field | Array value | Byte length | Byte offset | Description |
|---|---|---|---|---|
| Firmware Resource Count | | 4 | 0 | The number of firmware resource entries in the ESRT. Must not be zero. |
| Firmware Resource Maximum | | 4 | 4 | The maximum number of resource array entries that can be added without reallocating the table. Must be greater than or equal to Firmware Resource Count. |
| Firmware Resource Version | | 8 | 8 | The firmware resource entry version. This value should be set to 1. |
| Firmware Resource Entry Array | | | | Firmware Resource Entry 0 |
| | Firmware Class | 16 | 16 | A GUID that identifies a firmware component that can be updated via update capsule. This GUID will be passed into the UEFI update capsule run-time service as the update capsule header's CapsuleGuid parameter during update. |
| | Firmware Type | 4 | 32 | One of the following values that identifies the type of firmware resource:<br>0: Unknown<br>1: System firmware<br>2: Device firmware<br>3: UEFI driver |
| | Firmware Version | 4 | 36 | The current firmware version, where a larger number represents a newer release. The format of this value is not defined, but should incorporate version major and minor numbers. The recommended format is first word is major and second word is minor version numbers. |
| | Lowest Supported Firmware Version | 4 | 40 | The lowest firmware resource version to which a firmware resource can be rolled back for the given system/device. If a security related fix is available in this firmware version, then the least compatible version should be equal to the current firmware version. |
| | Capsule Flags | 4 | 44 | Flags that will be passed into the UEFI update capsule run-time service in bits 0-15 of the update capsule header's Flags field (the OS is responsible to configure bits 16-31 of Flags as defined by section 7.5.3 of the UEFI specification). |
| | Last Attempt Version | 4 | 48 | The last firmware version for which an update was attempted. This value uses the same format as Firmware Version. |
| | Last Attempt Status | 4 | 52 | One of the following values that describes the status of the last firmware update attempt:<br>0: Success<br>1: Unsuccessful<br>2: Insufficient resources<br>3: Incorrect version<br>4: Invalid image format<br>5: Authentication error<br>6: Power event - AC not connected<br>7: Power event - Insufficient battery |
| . . . | | | | Firmware Resource Entry 1 |

Table 2 illustrates an example and exemplary table definition for an ESRT table.

TABLE 2

| Field | Array value | Value | Comment |
|---|---|---|---|
| Firmware Resource Count | | 2 | This table contains two firmware resource entries. |
| Firmware Resource Maximum | | 2 | This table allocation contains enough space to describe a maximum of two resources. |
| Firmware Resource Version | | 1 | The firmware resource entry format version this table uses is 1. |
| Firmware Resource Entry Array | | Firmware resource entry 0 | |
| | Firmware Class | (SYSTEM_FIRMWARE) | This GUID identifies the system firmware for update via PnP. |
| | Firmware Type | 1 | System firmware type is 1. |
| | Firmware Version | 1 | The current system firmware version is 1. |
| | Lowest Supported Firmware Version | 1 | The lowest supported firmware version is 1, so firmware cannot be rolled back to a version earlier than version 1. |

TABLE 2-continued

| Field | Array value | Value | Comment |
|---|---|---|---|
| | Capsule Flags | 0 | System firmware doesn't define any private capsule update flags. |
| | Last Attempt Version | 1 | The last system firmware version for which an update was attempted was version 1. |
| | Last Attempt Status | 0 | The last system firmware update attempt was successful. |
| | Firmware resource entry 1 | | |
| | Firmware Class | (DEVICE_FIRMWARE) | This GUID identifies the device firmware for update via PnP. |
| | Firmware Type | 2 | Device firmware type is 2. |
| | Firmware Version | 1 | The current device firmware version is 1. |
| | Lowest Supported Firmware Version | 1 | The lowest supported firmware version is 1, so firmware cannot be rolled-back to a version earlier than version 1. |
| | Capsule Flags | 0x8010 | Device firmware defines private capsule update flags (0x8010). |
| | Last Attempt Version | 1 | The last device firmware version for which an update was attempted is version 1 |
| | Last Attempt Status | 0 | The last device firmware update attempt was successful. |

Figure 2:
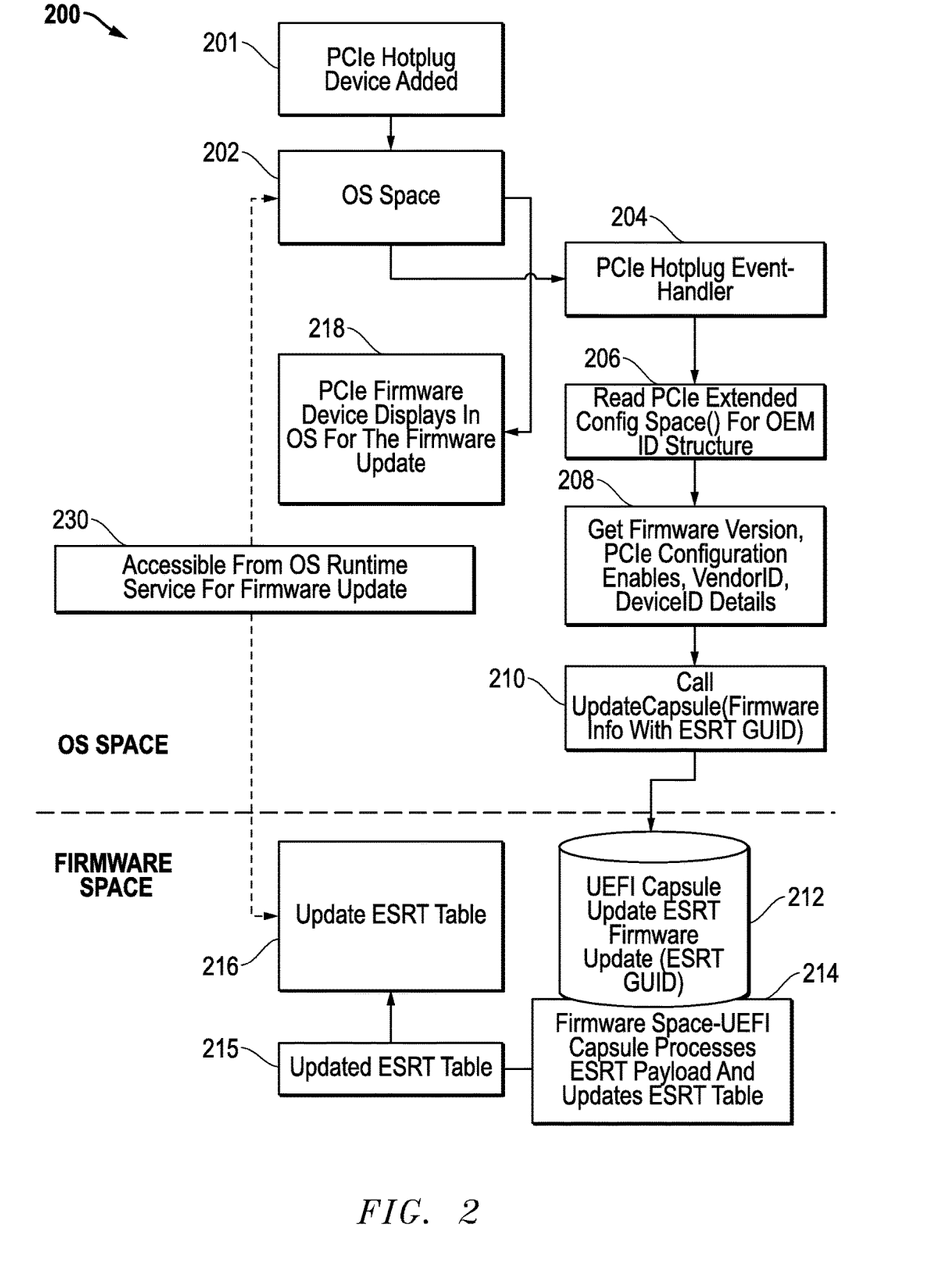
FIG. 2 illustrates exemplary methodology that may be implemented to update firmware of a hot-pluggable device according to one exemplary embodiment of the disclosed systems and methods.

FIG. 2 illustrates exemplary methodology 200 that may be implemented in one embodiment to update firmware of a hot-pluggable device of an information handling system at runtime using ESRT and UEFI capsule methodology. For purposes of illustration, FIG. 2 is described below in relation to the exemplary components of the embodiment of FIG. 1. However, it will be understood that methodology 200 may be implemented to update firmware for hot-pluggable devices using system configurations having different combinations of hardware components and/or system architectures.

As shown in FIG. 2, methodology 200 starts in step 201, when any given hot pluggable device (e.g., such as such as network adapter 107, video/graphics controller 109, solid state drive or hard drive storage 118 of FIG. 1) that is supported by OS 139 is newly inserted and communicatively coupled to a communication bus 103 (e.g., via PCIe connector to system PCIe serial expansion bus) while OS 139 is loaded and running on host processing device 110. In such a case, the newly inserted hot-pluggable device is not communicatively coupled to the communication bus 103 just prior to step 201. In the example case of a PCIe communication bus 103, this runtime hot plug insertion act generates a Hotplug Event 204 in runtime OS space 202 and causes the PCIe Event Handler executed by OS 139 to read the PCIe extended configuration space 302 in step 206, and particularly to read the device firmware version and optionally other firmware information from the OEM ID structure 306 of the inserted given PCIe Device in the PCIe extended configuration space 302. In one exemplary embodiment, the OEM ID structure 306 may include Firmware Version and other ESRT-related firmware information, such as Last Support Firmware Version, Capsule Flags, Last Attempt version, Last Attempt status, etc.

In step 208, the PCIe event handler reads additional attributes of the newly inserted given hot-pluggable device from the standard PCIe configuration space 304, such as PCIe configuration enables, Device ID, Vendor ID, etc. Then methodology 200 proceeds to step 210 where the PCIe event handler in the OS space formulates a Payload UEFI Capsule Update Routine 212, with the new payload for updating the ESRT Table( ) of the UEFI configuration table with a new ESRT Update GUID. Methodology 200 then proceeds to step 214 where UEFI Firmware Capsule Processing in firmware space that is executed by PCIe event handler on host processing device 110 processes the payload UEFI capsule update routine 212 (UpdateCapsule(ESRT GUID)) and updates the ESRT Table in step 214 with the details passed into the ESRT configuration table 215. Once, the details are added in the ESRT configuration table 215 in step 214, methodology 200 then exits the PCIe EventHandler( ) and stores updated ESRT configuration table 215 of the UEFI configuration table in step 216. Once so stored in step 216, then the newly added hot-pluggable device is displayed to the OS 139 in step 218 such that it is now recognized in the OS space, and the updated ESRT table in the firmware space is accessible from the OS runtime service 202 of the OS space for device firmware update operation as shown by the dashed arrow 230. After the firmware update is performed the newly added hot-pluggable device may be operated using the updated device firmware and without any additional reboot.

In one embodiment, all steps of methodology 200 through step 218 may be performed in the OS space during OS runtime without rebooting the OS. After step 216 is completed and the ESRT table is updated, the OS may be rebooted a single time to allow the OS runtime service 202 to access the ESRT table 215 of the UEFI configuration table in step 230 and to update the given hot-pluggable device firmware update according to the updated ESRT firmware version information (e.g., such as device firmware version, last or lowest supported firmware version, capsule flags, last attempt version, last attempt status, etc.), and to apply the device firmware update immediately without any additional OS reboots (e.g., via update from UEFI capsule). It will be understood that the steps of methodology 200 are exemplary only, and that any other sequence and/or combination of additional or fewer steps may be employed that is suitable for updating ESRT table entries for firmware of a given hot-pluggable device using firmware version information stored in extended configuration space (e.g., such as PCIe Extended Config Space) of the device while the system operating system (OS) is actively running on a host processing device (e.g., CPU) of an information handling system, and then completing device firmware update for the given hot-pluggable device using the updated ESRT firmware version information.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., including those performed by host processing device 110, remote out-of-band processing device 125, etc.) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
at least one processing device configured to execute a host operating system (OS);
non-volatile memory coupled to the processing device, the non-volatile memory having a Unified Extensible Firmware Interface (UEFI) table stored thereon; and
a Peripheral Component Interconnect Express (PCIe) communication bus coupled to the processing device, the PCIe communication bus being configured to receive a PCIe hot-pluggable device in data communication with the PCIe communication bus;
where the processing device is configured to use an update capsule to update EFI System Resource Table (ESRT) entries by performing the following steps in response to coupling of a new PCIe hot-pluggable device in data communication with a PCIe communication bus of the information handling system during runtime of an operating system (OS) executed by the processing device before performing any firmware update of the new PCIe hot-pluggable device after the new PCIe hot-pluggable device is coupled in data communication with the PCIe communication bus and without rebooting the OS after the new PCIe hot-pluggable device is coupled in data communication with the PCIe communication bus:
detect coupling of the new hot-pluggable device in data communication with the PCIe communication bus of the information handling system during the OS runtime, the new hot-pluggable device including device firmware and memory registers that contain a standard PCIe device configuration space and a separate extended PCIe device configuration space for the new hot-pluggable device, the extended PCIe device configuration space itself including one or more device firmware version details configured for updating ESRT entries,
then read the extended PCIe device configuration space and use an update capsule to retrieve the device firmware version details from the extended PCIe device configuration space of the new PCIe hot-pluggable device, and
then update entries of an ESRT of the UEFI table stored on the system non-volatile memory with the retrieved firmware version details read from the extended PCIe device configuration space of the new PCIe hot-pluggable device.

2. The system of claim 1, where the processing device is configured to use information from the updated ESRT to update the device firmware on the new PCIe hot-pluggable device, and then operate the new PCIe hot-pluggable device with the updated device firmware.

3. The system of claim 1, where the processing device is configured to reboot the OS no more than a single time after updating the ESRT and prior to performing the following steps without rebooting the OS again:
use information from the updated ESRT to update the device firmware on the new PCIe hot-pluggable device, and
then operate the new PCIe hot-pluggable device with the updated device firmware.

4. The system of claim 1, where the one or more device firmware version details contained in the extended PCIe device configuration space that are configured for updating ESRT entries include values that specify at least one of device firmware version, last or lowest supported firmware version, capsule flags, last attempt version, or last attempt status; and where the processing device is configured to read the values of the one or more entries from the extended PCIe device configuration space and then update the ESRT with the entries read from the extended PCIe device configuration space.

5. The system of claim 1, where the processing device is configured to:

generate a hot plug event in the runtime OS space upon detecting coupling of the new PCIe hot-pluggable device to the PCIe communication bus of the information handling system;

then respond to detection of the generated hot plug event by using an event handler executed by the OS on the processing device to read the device firmware version details from the extended PCIe device configuration space and to formulate a payload UEFI capsule update that includes at least some information from the read device firmware version details;

then use the device firmware version details from the payload UEFI capsule update in the firmware space to update the ESRT with one or more updated device firmware version details.

6. The system of claim 1, where the processing device is configured to:

access the stored updated ESRT in non-volatile memory of the information handling system from an OS runtime service of the runtime OS space;

retrieve updated device firmware version details from the stored updated ESRT; and update the firmware of the coupled new PCIe hot-pluggable device with the retrieved updated device firmware version details.

7. The system of claim 6, where the processing device is configured to reboot the OS no more than a single time after storing the updated ESRT and before accessing the stored updated ESRT, retrieving the update device firmware version details, and updating the firmware of the new PCIe hot-pluggable device.

8. The system of claim 1, where the new PCIe hot-pluggable device comprises at least one of a network adapter, a video/graphics controller, a solid state storage drive, a hard storage drive, or a redundant array of independent disks (RAID) controller.

9. The system of claim 1, where the information handling system comprises a computer server.

10. A method, comprising:

using at least one processing device of an information handling system to perform the following steps in response to coupling of a new Peripheral Component Interconnect Express (PCIe) hot-pluggable device in data communication with a PCIe communication bus of the information handling system during runtime of an operating system (OS) executed by the processing device before performing any firmware update of the new PCIe hot-pluggable device after the new PCIe hot-pluggable device is coupled in data communication with the PCIe communication bus and without rebooting the OS after the new PCIe hot-pluggable device is coupled in data communication with the PCIe communication bus:

detecting coupling of the new PCIe hot-pluggable device in data communication with the communication bus of the information handling system during the OS runtime, the new PCIe hot-pluggable device including device firmware and memory registers that contain an extended PCIe device configuration space that is separate from a standard PCIe device configuration space for the new PCIe hot-pluggable device, the extended PCIe device configuration space itself including one or more device firmware version details configured for updating EFI System Resource Table (ESRT) entries, then reading the extended PCIe device configuration space and using an update capsule to retrieve the device firmware version details from the extended PCIe device configuration space of the new PCIe hot-pluggable device, and then updating an ESRT of a Unified Extensible Firmware Interface (UEFI) table with the retrieved firmware version details read from the extended PCIe device configuration space of the new PCIe hot-pluggable device.

11. The method of claim 10, further comprising using the processing device to perform the following steps:

using information from the updated ESRT to update the device firmware on the new PCIe hot-pluggable device; and then operating the new PCIe hot-pluggable device with the updated device firmware.

12. The method of claim 10, further comprising using the processing device to reboot the OS no more than a single time after updating the ESRT and prior to using the processing device to perform the following steps without rebooting the OS again:

using information from the updated ESRT to update the device firmware on the new PCIe hot-pluggable device, and then operating the new PCIe hot-pluggable device with the updated device firmware.

13. The method of claim 10, where the one or more device firmware version details contained in the extended PCIe device configuration space that are configured for updating ESRT entries include values that specify at least one of device firmware version, last or lowest supported firmware version, capsule flags, last attempt version, or last attempt status; and where the method further comprises using the processing device to read values of the one or more entries from the extended PCIe device configuration space and to then update the ESRT with the entries read from the extended PCIe device configuration space.

14. The method of claim 10, further comprising using the processing device to:

generate a hot plug event in the runtime OS space upon detecting coupling of the new PCIe hot-pluggable device to the PCIe communication bus of the information handling system;

then respond to detection of the generated hot plug event by using an event handler executed by the OS to read the device firmware version details from the extended PCIe device configuration space and to formulate a payload UEFI capsule update that includes at least some information from the read device firmware version details; and then use the device firmware version details from the payload UEFI capsule update in the firmware space to update the ESRT with one or more updated device firmware version details.

15. The method of claim 14, further comprising using the processing device to store the updated ESRT of the UEFI table in non-volatile memory of the information handling system.

16. The method of claim 15, further comprising using the processing device to:
 access the stored updated ESRT in non-volatile memory of the information handing system from an OS runtime service of the runtime OS space;
 retrieve updated device firmware version details from the stored updated ESRT; and
 update the firmware of the coupled new PCIe hot-pluggable device with the retrieved updated device firmware version details.

17. The method of claim 16, further comprising rebooting the OS no more than a single time after storing the updated ESRT and before accessing the stored updated ESRT, retrieving the update device firmware version details, and updating the firmware of the new PCIe hot-pluggable device.

18. The method of claim 10, where the new PCIe hot-pluggable device comprises at least one of a network adapter, a video/graphics controller, a solid state storage drive, a hard storage drive, or a redundant array of independent disks (RAID) controller.

19. The system of claim 4, where the one or more device firmware version details contained in the extended PCIe device configuration space that are configured for updating ESRT entries include values that specify at least one of device firmware version, last or lowest supported firmware version, capsule flags, or last attempt firmware version.

20. The method of claim 10, further comprising storing the one or more device firmware version details in the extended PCIe device configuration space of the PCIe hot-pluggable device during factory provisioning.

* * * * *